United States Patent
Horsfall et al.

(10) Patent No.: US 12,523,206 B1
(45) Date of Patent: Jan. 13, 2026

(54) RECIPROCATING MOLTEN METAL PUMP

(71) Applicant: PYROTEK, INC., Spokane, WA (US)

(72) Inventors: Andrew Horsfall, Cuyahoga Falls, OH (US); Jon Tipton, Aurora, OH (US); Jason Tetkoskie, Cleveland Heights, OH (US)

(73) Assignee: PYROTEK, INC., Spokane, WA (US)

( * ) Notice: Subject to any disclaimer, the term of this patent is extended or adjusted under 35 U.S.C. 154(b) by 181 days.

(21) Appl. No.: 18/204,516

(22) Filed: Jun. 1, 2023

Related U.S. Application Data

(60) Provisional application No. 63/347,902, filed on Jun. 1, 2022.

(51) Int. Cl.
*F04B 15/04* (2006.01)
*F04B 23/02* (2006.01)

(52) U.S. Cl.
CPC ............ *F04B 15/04* (2013.01); *F04B 23/028* (2013.01)

(58) Field of Classification Search
CPC ..................................................... F04D 7/065
See application file for complete search history.

(56) References Cited

U.S. PATENT DOCUMENTS

| | | | | |
|---|---|---|---|---|
| 2,050,205 A * | 8/1936 | Bailey | ...................... | C03B 7/08 |
| | | | | 65/132 |
| 2,174,871 A * | 10/1939 | Davey | ..................... | F27D 1/004 |
| | | | | 52/506.03 |
| 2,432,646 A * | 12/1947 | Bailey | ....................... | C21B 9/06 |
| | | | | 165/DIG. 30 |
| 2,918,117 A * | 12/1959 | Griffin | .................. | F23D 11/002 |
| | | | | 431/116 |
| 3,198,675 A * | 8/1965 | Kiyoshi | ................... | B23H 5/00 |
| | | | | 148/714 |
| 7,278,824 B2 * | 10/2007 | Mordue | .................. | F04D 7/045 |
| | | | | 415/213.1 |
| 8,246,715 B2 * | 8/2012 | Thut | ...................... | F27D 3/0033 |
| | | | | 75/375 |
| 10,428,821 B2 * | 10/2019 | Cooper | ................... | F04D 7/065 |
| 11,874,062 B2 * | 1/2024 | Vild | ...................... | F27D 27/005 |
| 2001/0000465 A1 * | 4/2001 | Thut | ...................... | F04D 7/065 |
| | | | | 415/217.1 |
| 2002/0157920 A1 * | 10/2002 | Gattrell | ................ | B23Q 1/5468 |
| | | | | 198/375 |
| 2006/0198725 A1 * | 9/2006 | Thut | ....................... | F04D 7/065 |
| | | | | 415/93 |

(Continued)

OTHER PUBLICATIONS

Notch. Merriam-Webster.com Dictionary, Merriam-Webster, https://www.merriam-webster.com/dictionary/notch. Accessed Jan. 24, 2025. (Year: 2025).*

(Continued)

*Primary Examiner* — Dominick L Plakkoottam
*Assistant Examiner* — Geoffrey S Lee
(74) *Attorney, Agent, or Firm* — Lippes Mathias LLP

(57) ABSTRACT

A molten metal pumping apparatus. The apparatus has each of a circulation function and a transfer function. The apparatus includes a molten metal pump having an outlet. The pump is rotatable while submerged in molten metal to provide a first position wherein the outlet is engaged with a circulation passage in a furnace assembly and a second position wherein the outlet is engaged with a transfer passage in the furnace assembly.

8 Claims, 4 Drawing Sheets

(56) References Cited

U.S. PATENT DOCUMENTS

| | | | | |
|---|---|---|---|---|
| 2010/0184575 A1* | 7/2010 | Williams | ................ | B25J 15/04 |
| | | | | 483/13 |
| 2011/0140319 A1* | 6/2011 | Cooper | ................ | C22B 21/066 |
| | | | | 266/217 |
| 2021/0310736 A1* | 10/2021 | Vild | ........................ | F27B 3/045 |

OTHER PUBLICATIONS

Wall. Merriam-Webster.com Dictionary, Merriam-Webster, https://www.merriam-webster.com/dictionary/wall. Accessed Jan. 24, 2025. (Year: 2025).*

* cited by examiner

RECIPROCATING MOLTEN METAL PUMP

This application claims the benefit of U.S. 63/347,902, filed Jun. 1, 2022, the disclosure of which is herein incorporated by reference.

BACKGROUND

The present exemplary embodiment relates to a system for pumping molten metal. It finds particular application in conjunction with recycling of metals such as aluminum and will be described with particular reference thereto. However, it is to be appreciated that the present exemplary embodiment is also amenable to other similar applications.

Aluminum is the third most abundant element (after oxygen and silicon), and the most abundant metal in Earth's crust. It makes up about 8% by weight of the Earth's solid surface. Aluminum is remarkable for the metal's low density and for its ability to resist corrosion due to the phenomenon of passivation. Components made from aluminum and its alloys are vital to the world's production of structural materials. Aluminum is particularly valuable because of its further advantageous ability to be readily recycled.

Aluminum is typically either melted and cast into a finished product or cast into a billet for transport and eventual remelting and casting into the desired end product. Special handling equipment has been developed to facilitate the melting, processing, and transporting of molten aluminum.

Although the present disclosure has been associated with aluminum, it is noted that the equipment described herein may be equally suitable for use with other motel metals (and their salts), including zinc, magnesium, tin and lead as examples.

The process of molten metal handling and recycling is complex. It requires equipment for melting the metal, pumps for molten metal circulation, devices for submerging scrap metal pieces, devices for removal of impurities (e.g. filtering and degassing), devices for introduction of flux and other alloying agents, and devices for transport of the molten metal.

In a typical melting operation, a melting furnace is provided with an enclosed hearth and a connected open side well. A pump or other molten metal flow inducing apparatus is positioned in the side well and causes molten metal to circulate within the hearth. The side well may include a pump well and a melting bay which may be further divided into a charge well and a dross well. Metal may be melted by the introduction of solid bars to the main hearth and/or by the addition of metal pieces to the side well.

In the non-ferrous metals industry, scrap recycling has become a way of economic life. In fact, long before environmental concerns and conservation began to drive scrap recycling efforts, recycling of aluminum, copper, zinc, lead and tin occupied a firm niche in the marketplace. The metal pieces referenced above are often derived from recycled scrap materials.

The charge well can be utilized to melt metal scrap. Various pieces of equipment have been developed to help submerge the scrap pieces, and are referred to herein as scrap submergence devices. The dross well can be utilized to remove contaminants. Moreover, scrap metal is usually contaminated with organic and inorganic contaminants. Organic contaminants most commonly consist of remnants of various types of oils, coatings, or paints and the like. The inorganic contaminants may include dust particles, pigments, minor amounts of various scrap metals other than the principal metal, and the like. Aluminum scrap will also normally contain varying amounts of metal oxides. The majority of the contaminants will float to the top of the bath of molten metal or form slag or slag-like skin of inorganic contaminants on the molten metal which can be skimmed off of the metal in accordance with well-established techniques.

In the processing of molten metals, one commonly employed piece of equipment is a circulation pump for creating molten metal flow in a furnace. Another common type of equipment is a transfer pump to transport molten metal from one vessel to another. When the molten metal needs to be removed from the furnace system by elevating it over a containment wall, the so-called transfer pump is often used. Most typical of this situation is where the transfer pump is placed in the open side well of a molten metal furnace to remove molten metal from the furnace, perhaps for introduction to a ladle and from there to die casters.

An aluminum recycling furnace is described in U.S. Pat. No. 6,217,823 which is herein incorporated by reference. Referring now to FIG. 1, an aluminum recycling furnace 100 is depicted. Furnace 100 includes a main hearth component 120 which is heated, for example, with gas burners or by any other means known in the art. Adjacent, and in fluid communication with the hearth 120, is the primary recycling area comprised of a side well 130 having a pump well 140, a charge well 160 and a dross well 180. Although not shown, the wall of the hearth 120 opens to the pump well 140, which opens to the charge well 160, which opens to the dross well 180, which in turn opens to the hearth 120 to allow the circulation pattern shown by the arrows. The pump well receives a molten metal pump. The molten metal pump circulates molten metal from the hearth 120 to the charge well 160 where scrap chips of the metal to be processed are deposited onto the surface of the melt. Molten metal from the charge well 160 flows into the dross well 180 where impurities in the form of dross are skimmed from the surface before the melt flows back into the hearth 120.

Referring now to FIG. 2, a molten metal circulation pump 200 within a pump well 201 of recycling furnace 203 is shown. Pump 200 includes a plurality of posts 205 attached to a base 207 and suspended from a motor mount 209. An impeller (not shown) is disposed within base 207 and connected to motor 210 via a shaft and coupling (not shown). Pump 200 circulates molten metal from pump well 201 into charge well 211 and dross well 213. The pump depicted in FIG. 2, is commonly referred to as a circulation pump.

The present disclosure advantageously provides a system that can accomplish both molten metal circulation and transfer of molten metal within a furnace using a single molten metal pump.

BRIEF DESCRIPTION

Various details of the present disclosure are hereinafter summarized to provide a basic understanding. This summary is not an extensive overview of the disclosure and is neither intended to identify certain elements of the disclosure, nor to delineate scope thereof. Rather, the primary purpose of this summary is to present some concepts of the disclosure in a simplified form prior to the more detailed description that is presented hereinafter.

In accord with one aspect of the present exemplary embodiment, a molten metal pumping apparatus is provided. The apparatus has each of a circulation function and a transfer function. The apparatus includes a molten metal pump having an outlet. The pump is rotatable while submerged in molten metal between a first position engaged with a circulation passage in a furnace assembly and a second position engaged with a transfer passage in the furnace assembly.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
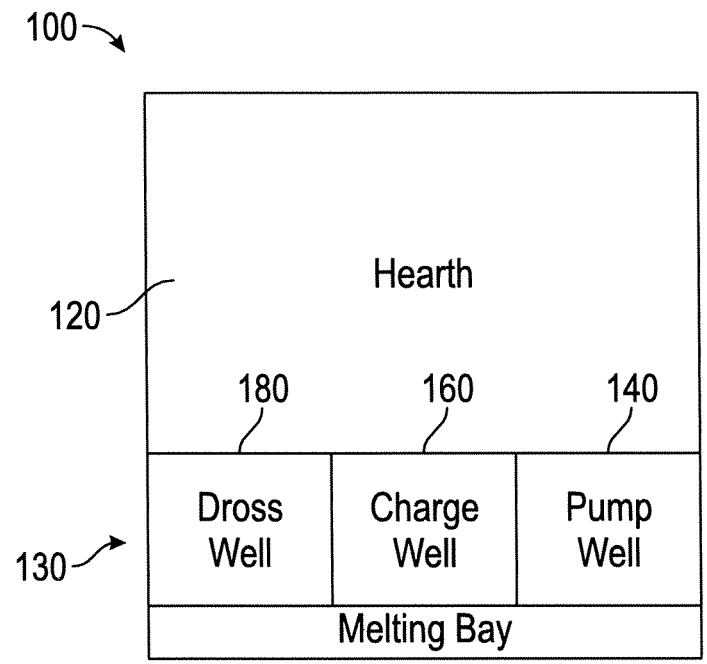
FIG. 1 is a schematic illustration of a typical molten metal furnace.
Figure 2:
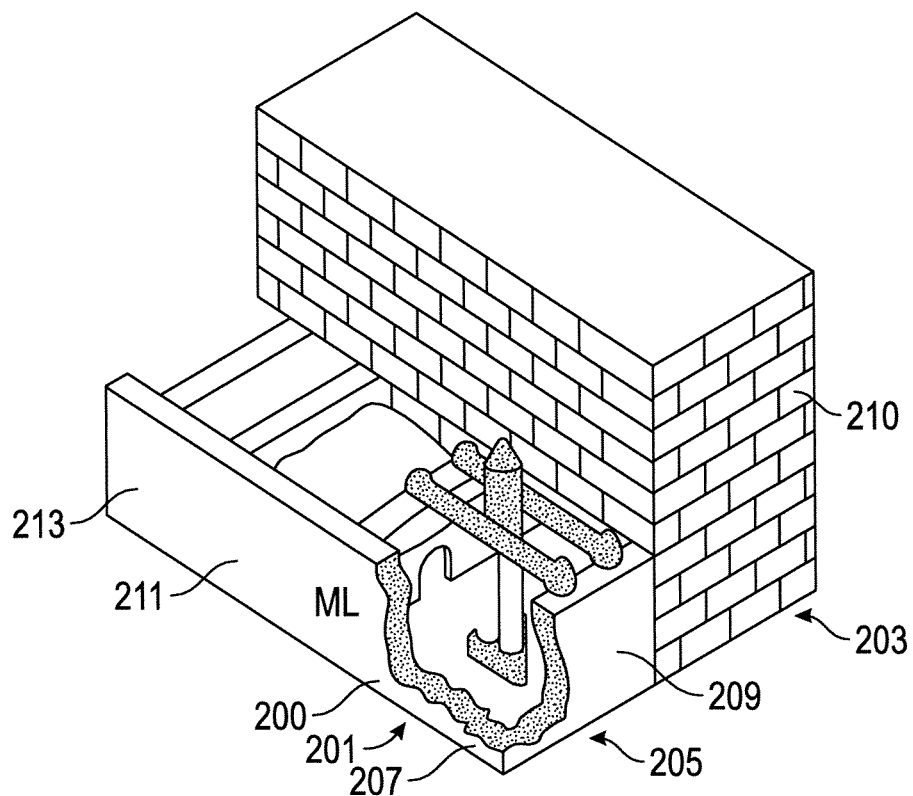
FIG. 2 is a perspective view of a prior art molten metal furnace.

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used herein, the terms about, generally and substantially are intended to encompass structural or numerical modifications which do not significantly affect the purpose of the element or number modified by such term. For example, substantially relative to an orientation can mean less than or equal to about a 33% variation, and in some embodiments, less than about a 20% variation.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Figure 3:
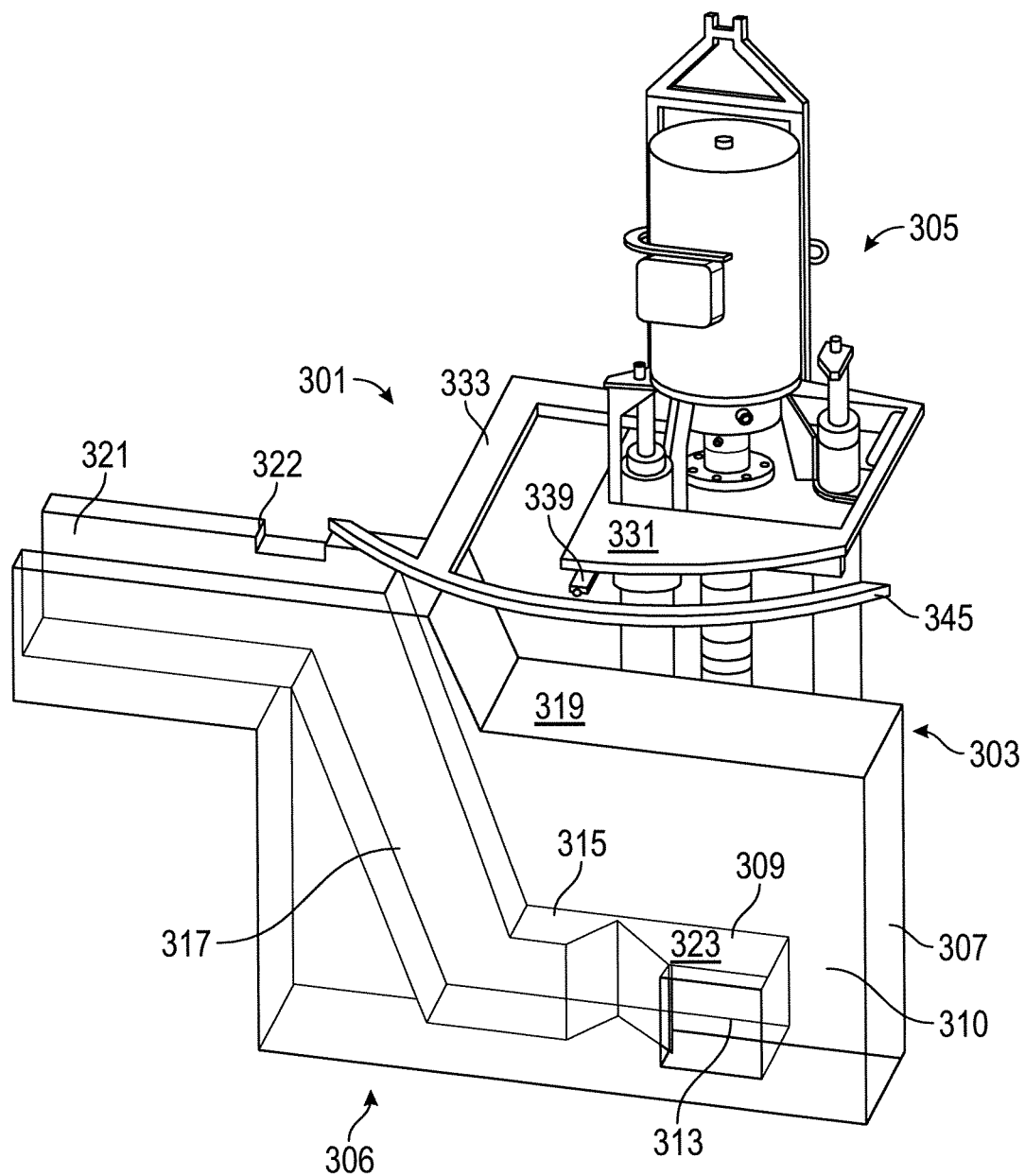
FIG. 3 is a perspective view of the present molten metal pumping system.
Figure 4:
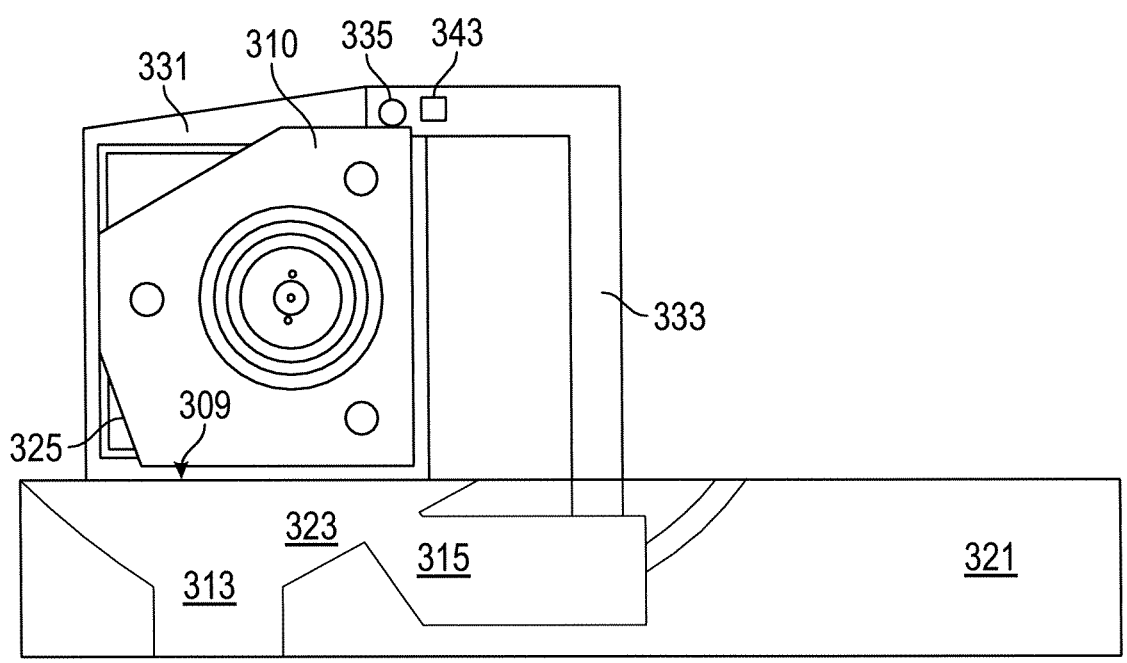
FIG. 4 is a bottom view, partially in phantom, of the present molten metal pumping system in a circulation mode.
Figure 5:
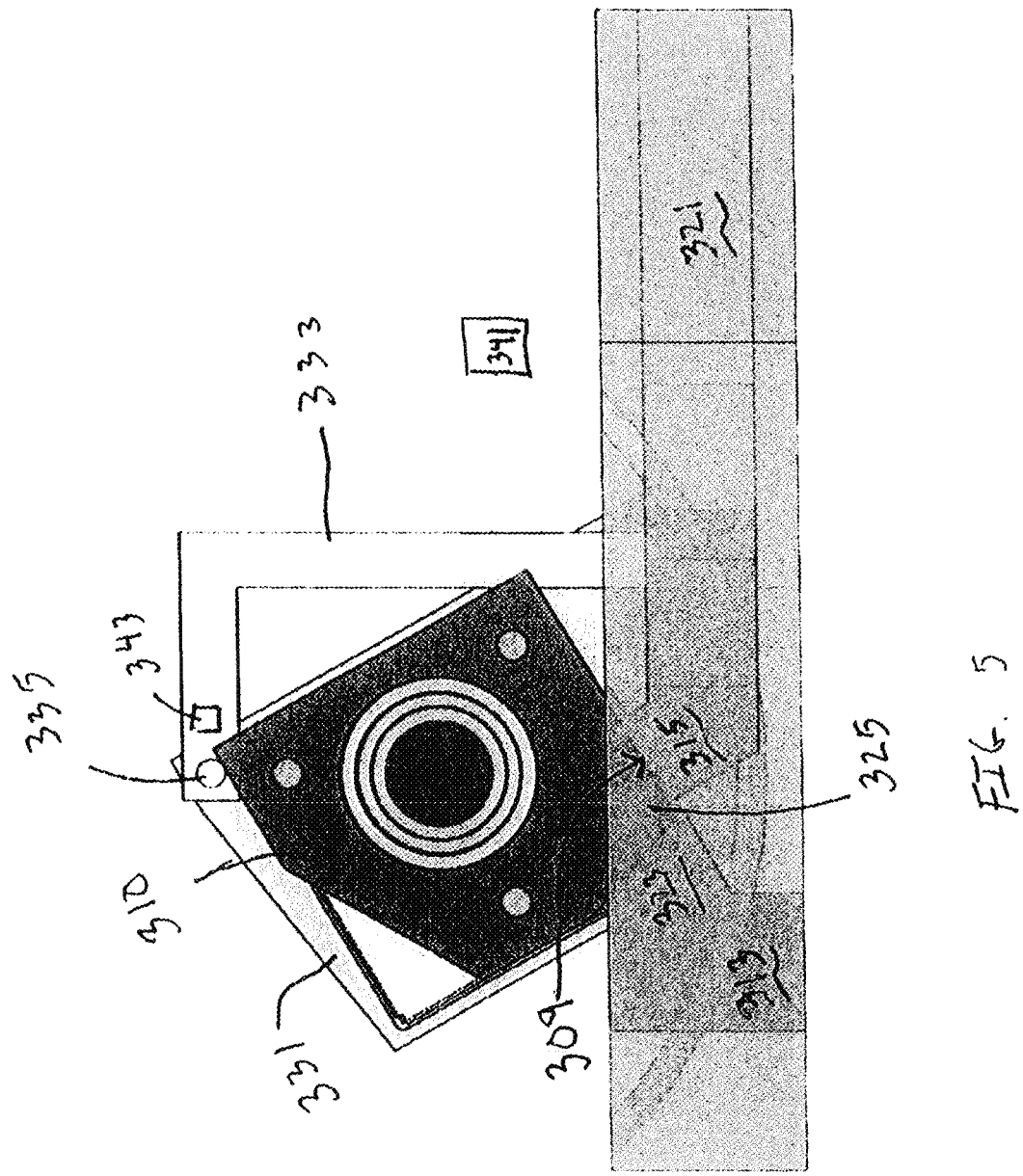
FIG. 5 is a bottom view, partially in phantom, of the present molten metal pumping system in a transfer mode.

Referring now to FIGS. 3-5, a portion 301 of a melt furnace is illustrated. The furnace includes a pump well 303 within which circulation pump 305 is disposed. The pump can be a type available from Pyrotek, Inc. Exemplary pumps are described in U.S. Pat. Nos. 5,203,001 and 6,887,425, the disclosures of which are herein incorporated by reference. A wall 307 constructed of a refractory material such a graphite, ceramic or brick separates pump well 303 from a second well 306.

Pump 305 can be either or both of a top or bottom inlet to receive molten metal entering pump well 303 from the main hearth of the furnace. Pump 305 includes an outlet 309 in pump base 310 facing wall 307. In some embodiments, the pump outlet 309 may be in physical contact with the wall 307. In some embodiments, the pump outlet 309 may be located close to wall 307, such as within greater than 0 to less than about 6 inches.

Wall 307 includes a first circulation passage 313 that extends at least substantially horizontally to a longitudinal axis of wall 307. Wall 307 also includes a second transfer passage 315. The second transfer passage 315 includes an at least substantially vertical segment 317 leading to a top surface 319 of wall 307. Top surface 319 includes a launder 321 which receives molten metal from the second passage and directs the molten metal out of the furnace assembly to a ladle or casting apparatus, for example. Launder 321 may include an overflow passage 322 for return of excess molten metal to the well 303.

The second passage 315 can be disposed in a notch 323 formed in the wall 307. The notch 323 can extend between the circulation passage 313 and the outer surface of the refractory wall at an angle "a" to a longitudinal axis of the circulation passage (e.g. between 30° and) 80°. The notch 323 can be sized to be commensurate in height and width relative to a corner 325 of the pump base 310. Moreover, when the pump is moved into a transfer position, the notch receives the corner 325 of the pump base 310 to allow alignment between the pump outlet 309 and the inlet of the second passage 315.

Pump 305 is suspended from a motor mount 331, which itself is supported upon frame 333. Engagement between motor mount 331 and frame 333 can involve a rotatable hinge connection 335 allowing pump 305 to selectively rotate. Motor mount 331 may include an arcuate edge 337 including a roller assembly 339 that engages arcuate arm 345 of frame 333. In this manner, the weight of the pump 305 and motor mount 331 is supported on opposed sides.

The outlet of pump 305 can be rotated between selective alignment with the first passage 313 to provide circulation of the furnace or the second passage 315 to provide removal of molten metal from the furnace via launder 317.

In certain embodiments, the pump will be moved by a hydraulic arm or other mechanism. A wire/cable and/or pulley system 341 may be used to allow equipment (e.g. pneumatic, hydraulic, electrical or human) to engage the motor mount 331 and rotate the pump while being located remote from the heat of the molten metal bath. In certain embodiments, the mechanism for rotating the pump will include a limit switch 343 configured to position the pump into proper alignment with either the first or second passage. In certain embodiments, rotation of the pump may be computer controlled.

To aid the Patent Office and any readers of this application and any resulting patent in interpreting the claims appended hereto, applicants do not intend any of the appended claims or claim elements to invoke 35 U.S.C. 112 (f) unless the words "means for" or "step for" are explicitly used in the particular claim.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A molten metal pumping system having each of a circulation function and a transfer function, said system including a molten metal pump having an outlet, said pump being rotatable while submerged in molten metal between a first position engaged with a circulation passage in a furnace assembly and a second position engaged with a transfer passage in the furnace assembly, said circulation passage and said transfer passage being formed in a refractory wall, said wall separating a pump well housing said molten metal pump and another chamber of the furnace assembly; wherein an inlet to said circulation passage is parallel with an outer surface of the refractory wall and an inlet to said transfer passage is located in a notch formed in said refractory wall; wherein said notch extends between the circulation passage and the outer surface of the refractory wall at an angle between 30° and 80° to a longitudinal axis of the circulation passage; and wherein a base of the molten metal pump is received in the notch when the transfer passage is engaged.

2. The pumping system of claim 1 wherein the molten metal pump is suspended from a frame.

3. The pumping system of claim 2 wherein a motor mount of the molten metal pump is secured to the frame.

4. The pumping system of claim 3 wherein a rotatable hinge attaches the motor mount to the frame.

5. The pumping system of claim 4, wherein remote equipment engages the motor mount through a cable system to drive rotation.

6. The pumping system of claim 5 further including limit switches to stop rotation when the pump outlet is suitably aligned with one of the transfer passage or the circulation passage.

7. The pumping system of claim 2 wherein said molten metal pump is suspended from the frame at a pivot point.

8. The pumping system of claim 1 wherein said transfer passage is in fluid communication with a launder adjacent a top portion of the wall.

* * * * *